3,478,153
METHOD OF PROTECTING SHEEP FROM BLOWFLY LARVAE
James Fraser and Ian Robert Harrison, Nottingham, England, assignors to Boots Pure Drug Company Limited, Nottingham, England, a British company
No Drawing. Original application Jan. 13, 1964, Ser. No. 337,156. Divided and this application June 22, 1967, Ser. No. 658,970
Claims priority, application Great Britain, Jan. 29, 1963, 3,650/63
Int. Cl. A01n 9/20; C07c 127/18
U.S. Cl. 424—300                           1 Claim

ABSTRACT OF THE DISCLOSURE 3,5-di-t-butylphenyl N-methylcarbamate is applied externally to sheep to protect them from larvae of sheep blowfly. Such compound exhibits low mammalian toxicity and at the same time long persistence on the fleece of sheep.

Related application

This application is a division of application Ser. No. 337,156, filed Jan. 13, 1964, now abandoned.

This invention relates to a new insecticidal compound, processes for its manufacturer, insecticidal compositions containing it and the use of the compound to control insects.

It is now common practice to treat sheep externally with insecticides at regular intervals in order to prevent blowfly "strike" i.e. to prevent sheep blowfly larvae from feeding upon and damaging the skin of the sheep. For this purpose, chlorinated hydrocarbons e.g. dieldrin and aldrin, and organophosphorus compounds e.f. diazinon, have been used with success. Notwithstanding this, it is desirable that an insecticide of a different chemical type which is capable of preventing blowfly strike be available, as resistance to the commonly used compounds is developing.

To be useful for the prevention of blowfly "strike," a compound must possess at least the following three properties:

(1) It must be highly active against sheep blowfly larvae.

(2) When applied in a suitable formulation to the wool of the sheep, it must persist for at least 12 weeks and during this entire time exhibit its high activity towards blowfly larvae.

(3) It must be safe in use i.e. it must not be unduly toxic to sheep or humans.

The present invention is based on our finding that 3,5-di-t-butylphenyl N-methylcarbamate, hitherto undescribed, possesses the aforesaid properties. Thus this new compound is highly active against Diptera larvae, e.g. sheep blowfly (*Lucilia sericata*) larvae, exhibits its high activity for a period in excess of 12 weeks when applied to sheep wool, and has very low toxicity. (Acute oral $LD_{50}$ mice is greater than 1000 mg./kg.)

According to one feature of the present invention there is provided 3,5-di-t-butylphenyl N-methylcarbamate.

According to a further feature of the invention there are provided processes for the preparation of 3,5-di-t-butylphenyl N-methylcarbamate whereby said compound is prepared by methods known for the preparation of esters of N-methylcarbamic acid and phenol or substituted phenols. By "known methods" we mean methods described in the literature or commonly used in the chemical art. Typical methods include the following:

(1) Reaction of a 3,5-di-t-butylphenyl haloformate e.g. the chloroformate with methylamine. The haloformate is conveniently made in situ by the reaction in an inert solvent of the phenol and phosgene in the presence of an acid-binding agent such as a tertiary base e.g. pyridine, N,N-dimethylaniline etc.

(2) Reaction of 3,5-di-t-butylphenol with methyl, isocyanate.

(3) Reaction of a carbonic acid ester of Formula I

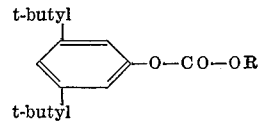

wherein R represents a hydrocarbon radical, preferably lower alkyl, with methylamine.

(4) Reaction of 3,5-di-t-butylphenol with an N-methylcarbamoyl halide, e.g. the chloride.

(5) Reaction of 3,5-di-t-butylphenol with another ester, preferably a lower alkyl ester, of N-methylcarbamic acid.

(6) Methylation of 3,5-di-t-butylphenyl carbamate. Preferred methods are (1), (2) and (4).

According to a further feature of the invention there are provided sheep dips as hereinafter defined, which comprise as an insecticidal active ingredient 3,5,di-t-butylphenyl N-methylcarbamate. By the term "sheep dips" we mean compositions which contain an insecticidal active ingredient in association with diluents or carriers, the nature of the diluents or carriers and their proportions being such that on dilution with an appropriate quantity of water, stable aqueous compositions are produced which are suitable for the treatment of sheep by the standard procedures of dipping and spraying.

Dips of the type with which this invention is concerned may take the form of dispersible powders or miscible liquids. The technique for formulating such compositions, and the selection of diluents and carriers and their proportions will be known or obvious to those skilled in the art; therefore brief details only are described in the following:

Dispersible powder.—This comprises essentially a pesticidal active ingredient in association with one or more dispersing agents so that a stable aqueous dispersion of the active ingredient is formed on adding the powder to water. The active ingredient is in the form of very fine particles, the majority of which, of the order of at least 95%, should be less than $50\mu$, with about 75% of them being $5-20\mu$. A conventional solid inert diluent is usually necessary, either as a grinding aid e.g. kaolin or as an absorbent for the dispersing agent e.g. finely-divided silica. The proportion of dispersing agent to active ingredient is arranged so that on dilution with water a stable dispersion of the active ingredient is obtained. This is an essential feature of a dispersible powder intended as a sheep dip, in order that settling-out of the active ingredient in the dipping bath does not occur. The proportion of dispersing agent to active ingredient is also arranged so that passage of sheep through the dipping bath does not result in excessive depletion of the active ingredient from the bath. The nature of the chosen dispersing agent is also important in connection with this latter feature, anionic or non-ionic agents being desirable. In most cases a dispersible powder will also contain a small amount of a wetting agent, just sufficient that is to ensure a rapid wetting of the powder so that dilution with water is facilitated. Clearly non-toxic and non-irritant dispersing and wetting agents are essential. Such agents suitable for sheep dips are well-known in the art. Typical examples are sulphite lye as a dispersing agent and a polyethylene oxide condensate of an alkylphenol as a wetting agent (e.g. the polyethylene oxide condensate of octylphenol available under the Registered Trade Mark "Eethylan C. P.").

Miscible liquid.—This comprises essentially a pesticidal active ingredient in association with one or more emulsifying agents and a suitable water-immiscible solvent. Emulsifying agents suitable for use in sheep dips are well-known in the art. It is frequently advantageous to employ two emulsifying agents, one favouring the oil phase and the other favouring the aqueous phase, as it is essential that, on dilution with water, a very stable emulsion is formed in order to avoid separation of the oil and aqueous phases. Manufacturers of emulsifying agents frequently develop mixtures of, for example, an anionic and a non-ionic agent which are recommended for use in miscible liquids. Such a mixture may comprise a salt of an alkylbenzene sulphonic acid, e.g. calcium dodecylbenzene-sulphonate and an ethylene oxide-alkylphenol condensate. The concentration of emulsifying agent(s) will be sufficient to ensure a stable emulsion. Clearly non-toxic and non-irritant agents are essential. Solvents suitable for use in sheep dips are also well-known in the art, such as some of those available from coal and petroleum. The solvents must be non-toxic and non-irritant, for example, non-volatile, high boiling aromatic hydrocarbon fractions. Typical examples include "heavy aromatic solvent" as supplied by various petroleum companies, "mixed methyl naphthalene fractions" derived from coal, and a heavy aromatic solvent sold under the proprietary names of Edmor 11 DA and Edmor 11 TJ. Mixed solvents may be used, isophorene and cyclohexanone being examples of well-known suplementary solvents used in minor quantities in admixture with the aforementioned hydrocarbons. The light aromatic hydrocarbons such as benzene, toluene, xylene etc. are not suitable for use in sheep dips because of their irritant properties.

Sheep dips as described above preferably also contain a bacteriostat in order to prevent infection in the sheep due to the bacteria, particularly *Erysipolethrix rhusiopathiae*, frequently found in dipping baths. For dispersible powders, copper sulphate is commonly used. For miscible liquids, oil-soluble copper or zinc salts are suitable, for example copper or zinc naphthenate.

Preferred compositions according to the invention are miscible liquids as hereinbefore described in which the solvents consist wholly or partly of high boiling tar acids. We have found that using high boiling tar acids (viz. mixtures of high boiling phenols obtained mainly from the middle or carbolic oil fractions of coal tar distillation), it is possible to prepare miscible liquids containing 3,5-di-t-butylphenyl N-methylcarbamate at a concentration of 20% w./v. which are stable during storage at low temperatures. A particular mixture of high boiling tar acids which we have found to give very satisfactory results that sold by Coalite and Chemical Products Ltd. under the name "Coalite D.X.L. high boiling tar acids." This is a light amber coloured liquid, specific gravity 1.021 at 15° C., boiling range 230–280° C.

The preferred miscible liquids may contain high boiling tar acids as the sole solvent, but in order to minimize the danger of irritation of the sheep, to reduce costs to a minimum and to permit adjustment of the specific gravity of the miscible liquid to as near to 1.0 as possible, it is preferable to include one or more water-immiscible organic liquid diluents. In such cases, the solvent of the immiscible liquid would be a solution of the high boiling tar acids in said organic liquid diluent or diluents. Such diluents, which should naturally be non-irritant to sheep, are preferably water-immiscible organic liquids with a specific gravity near to 1.0 and boiling above 200° C. They need not be, and normally would not be, good solvents for the active ingredients, as the solvent power of the complete solvent system is produced by the content of high boiling tar acids. Paraffin oils with specific gravities near to 1.0 and boiling above 200° C. are suitable. For example, spindle oil may be used, specific gravity 0.86–0.92, boiling range about 315–380° C.

The solvent system of the preferred miscible liquids should preferably contain at least 20% by volume of high boiling tar acids. However, higher concentrations are necessary if miscible liquids, which contain a high concentration of active ingredient and are stable at low temperatures, are desired. Using the spindle oil as an organic liquid diluent. we have found that satisfactory results are obtained using a solvent system containing about 50–100% by volume of high boiling tar acids and 0–50% by volume of spindle oil. We prefer to use a solvent system containing about 83% by volume of high boiling tar acids and about 17% by volume of spindle oil (these percentages represent the percentage concentration of each component based on the solvent system, and not the percentage concentration based on the total volume of miscible liquid).

Any emulsifying agent or combination of two or more agents, which is capable of producing an emulsion of the required stability when the miscible liquids are diluted with water, may be used in the preferred miscible liquids of the invention. Good results are obtained using a salt of an alkyl phenol ether sulphate and we prefer to use the agent marketed by Lankro Chemicals Ltd. under the name "Perlankrol P.A. conc.," which we understand to be an ammonium alkyl phenol ether sulphate. If more than one emulsifying agent is used, it is advantageous to employ one which favours the aqueous phase, e.g. an anionic agent, in conjunction with one which favours the organic phase, e.g. a non-ionic agent. We prefer to augment the emulsifying action of the Perlankrol P.A. conc. by the inclusion of sulphated castor oil and triethanolamine.

The high boiling tar acids which are included in the solvents of the preferred miscible liquids of the invention, in addition to functioning as solvents, function as bacteriostats in the diluted dipping baths and sheep dips of this type do not require the inclusion of a separate bacteriostat.

The sheep dips according to the present invention may contain additional pesticides. Thus for example, benzene hexachloride may be included for the control of sheep scab (*Psoroptes communis ovis*).

The concentration of 3,5-di-t-butylphenyl N-methylcarbamate in the diluted dipping bath or spray will depend on a number of factors, including the size of the dipping bath, the number of sheep to be dipped, the technique chosen for topping-up, etc., but will normally be 0.005–0.5%, preferably about 0.01–0.1%.

According to a further feature of the invention there is provided a method of protecting sheep from the larvae of sheep blowfly which comprises treating the sheep externally with 3,5-di-t-butylphenyl N-methylcarbamate.

Activity.—3,5-di-t-butylphenyl N-methylcarbamate has shown to be effective against sheep blowfly larvae in the following manner. A small cotton wool plug was treated with 0.5 ml. of an 0.05% w./v. solution of the compound in acetone. After the acetone had evaporated, 20–30 sheep blowfly larvae were placed on the wool, which, together with sterile sheep serum for nutrient, was kept in a glass container for 24 hours. The percentage mortality of the larvae was recorded at the end of this time. Similar tests at lower concentrations were also carried out. The results are shown in Table I, together with results obtained with closely related compounds for comparison purposes.

TABLE 1

| Compound | Percent mortality at various concentrations | | | | |
|---|---|---|---|---|---|
| | 0.05 | 0.025 | 0.0125 | 0.00625 | 0.003125 |
| 3,5-di-t-butylphenyl N-methycarbamate | 100 | 100 | 100 | 100 | 100 |
| 3,5-dimethylphenyl N-methylcarbamate | 100 | 76 | 91 | 0 | 0 |
| 3,5-di-isopropylphenyl N-methylcarbamate. | 100 | 100 | 100 | 100 | 100 |
| | 0.001 | 0.0005 | 0.00025 | 0.000125 | |
| 3,5-di-t-butylphenyl N-methylcarbamate. | 88 | 86 | 70 | 51 | |

As stated earlier, to be useful for the prevention of blowfly "strike," a compound must not only be highly active against sheep blowfly larvae but it must also be safe in use. In the above Table I 3,5-di-isopropylphenyl N-methylcarbamate is shown to possess high activity against sheep blowfly larvae but because of this compound's high mammalian toxicity its effect at lower concentrations was not determined. In standard experiments to determine the oral toxicity towards mice, results in Table II were obtained.

TABLE II

| Compound | Dose, mg./kg. | No. of mice killed/No. of mice dosed |
|---|---|---|
| 3,5-di-t-butylphenyl-N-methylcarbamate. | 1,000 | 0/2 |
| 3,5-di-isopropylphenyl N-methylcarbamate. | 1,000 | 2/2 |
| | 500 | 2/2 |
| | 250 | 2/2 |
| | 100 | 3/3 |
| | 60 | 0/2 |

Because of its high mammalian toxicity, 3,5-di-isopropylphenyl N-methylcarbamate could not be considered for commercial use in a sheep dip.

The activity of 3,5-di-t-butylphenyl N-methylcarbamate has been compared with alpha-naphthyl N-methylcarbamate (a commercially available carbamate insecticide) and with dieldrin (the most widely used active ingredient in sheep dips) and the results are shown in Table III (obtained using the same test method as that used for the results of Table I).

TABLE III

| Percent concentration | Percent Mortality | | |
|---|---|---|---|
| | 3,5-di-t-butylphenyl N-methylcarbamate | Alpha-naphthyl N-methylcarbamate | Dieldrin |
| 0.001 | 88 | 6 | 27 |
| 0.0005 | 86 | 0 | 31 |
| 0.00025 | 70 | 0 | 20 |
| 0.000125 | 51 | 0 | 0 |

Persistence.—As stated earlier, to be useful for the protection of sheep against sheep blowfly larvae, a compound must not only be active against the pest, but must also persist on the sheep fleece for many weeks, preferably at least 12 weeks, and exhibit its high activity for this period, as it is only practicable to treat sheep at fairly infrequent intervals. The following experiment shows the persistence of the compound of the invention.

A sheep was sprayed with 500 ml. of an 0.1% w./v. aqueous composition of 3,5-di-t-butylphenyl N-methylcarbamate prepared by diluting with water an acetone solution of the compound containing a suitable dispersing agent. Immediately after spraying, wool samples were taken from the sheep and submitted to the test previously described. Each week thereafter, wool samples were taken and tested similarly. In addition each week after treatment the sheep was artificially infested on its back with sheep blowfly larvae, which were observed for normal development. Results are shown in Table IV.

TABLE IV

| Compound | No. of weeks after treatment | | | | | | | | Test |
|---|---|---|---|---|---|---|---|---|---|
| | 0 | 1 | 2 | 3 | 4 | 5 | 6 | 7 | |
| 3,5-di-t-butylphenyl N-methyl-carbanate. | 100 | 100 Died | 100 Died | 100 Died | 100 Died | 100 Died | 100 Died | 100 Died | Percent mortality Artificially implanted larvae. |

| Compound | No. of weeks after treatment | | | | | | | Test |
|---|---|---|---|---|---|---|---|---|
| | 8 | 9 | 10 | 11 | 12 | 13 | 14 | |
| 3,5-di-t-butylphenyl N-methyl-carbanate. | 100 Died | 100 Died | 100 Died | 100 Died | 100 Died | 100 Died | 50 Strike | Percent mortality Artificially implanted larvae. |

In Table V there are listed a number of carbamates which possess high activity against sheep blowfly larvae when subjected to the test hereinbefore described, together with the persistence of these compounds on sheep as measured in the persistence test hereinbefore described. For example, a persistence of 3 weeks indicates that on the fourth week artificially implanted sheep blowfly larvae lived and caused a "strike." The inability of these compounds to persist and to exhibit their activity for a long period, is to be noted and compared with the results obtained with 3,5-di-t-butylphenyl N-methylcarbamate.

Table V

Compound R—O—CONHCH₃R=:

| | Persistence (weeks) |
|---|---|
| 2-ethylphenyl | 6 |
| 2-allylphenyl | 5 |
| 2-isopropylphenyl | 6 |
| 2-sec. butylphenyl | 6 |
| 2-isobutylphenyl | 4 |
| 3-t-butylphenyl | 1 |
| 2-(cyclopent-2-enyl)phenyl | 0 |
| 2-cyclohexylphenyl | 1 |
| 2-cyclohexyl-4-methylphenyl | 1 |
| 2,3-dimethylphenyl | 1 |
| 2-isopropyl-5-methylphenyl | 6 |
| 5-isopropyl-2-methylphenyl | 2 |
| 2,3,5-trimethylphenyl | 6 |
| 2-methoxyphenyl | 0 |
| 2-ethoxyphenyl | 6 |
| 3,5-dimethoxyphenyl | 0 |
| 2-methylthiophenyl | 1 |
| 2-isopropylthiophenyl | 5 |
| cf. 3,5-di-t-butylphenyl | 13 |

The following non-limitative examples illustrate the invention.

Example 1

N,N-dimethylaniline (23 cc.) was added dropwise to a mechanically stirred mixture of 3,5-di-t-butylphenol (30.9 g., 0.15 mole) and a solution of phosgene (18 g., 0.18 mole) in dry toluene (180 cc.) keeping the temperature at 20–25° C. by external cooling. Stirring was continued for 4 hours at room temperature, and then the flask was immersed in ice-water and gaseous methylamine bubbled into the stirred reaction mixture at such a rate that the temperature did not exceed 25°. When the mixture became alkaline the flow of methylamine was interrupted, and stirring was continued for a further 30 minutes. The alkaline suspension was poured into a mixture of crushed ice and an excess of 2N HCl, and the toluene layer was separated and washed with 2N HCl, until free from dimethylaniline. After being washed with water followed by N NaOH to remove any unchanged dibutylphenol, the organic layer was finally washed with water, dried ($Na_2SO_4$), and distilled under reduced pressure to remove toluene. Crystallisation of the residue from aqueous, alcohol and subsequently from light petroleum (B.P. 60–80°) gave 3,5-di-t-butylphenyl N-methylcarbamate (20.4 g.) (M.P. 100–102° C.). (Found: C, 73.1; H, 9.7. $C_{16}H_{25}NO_2$ requires C, 73.0; H, 9.5%).

Example 2

A dispersible powder was prepared by grinding a mixture of 3,5-di-t-butylphenyl N-methylcarbamate (20 parts). Belloid T.D.—a proprietary dispersing agent which is polymethylene bis-naphthol sodium sulphonate (8 parts) and kaolin (72 parts).

Example 3

A miscible liquid was prepared containing the following ingredients:

| | Percent w./v. |
|---|---|
| 3,5-di-t-butylphenyl N-methylcarbamate | 10 |
| Arylan C.A. (a proprietary emulsifying agent which is calcium dodecylbenzene sulphonate) | 4.5 |
| Ethylan B.V. (a proprietary emulsifying agent which is calcium dodecylbenzene sulphonate) | 4.5 |
| densate) | 10.5 |
| Mixed methylnaphthalene fractions to 100% vol. | |

Example 4

A miscible liquid was prepared containing the following ingredients:

| | Percent w./v. |
|---|---|
| 3,5-di-t-butylphenyl N-methylcarbamate | 10 |
| Arylan C.A. | 4.5 |
| Ethylan B.V. | 10.5 |
| Isophorone | 50 |
| Edmor 11 T.J. to 100% vol. | |

Example 5

A miscible liquid was prepared containing the following ingredients:

| | | |
|---|---|---|
| 3,5-di-t-butylphenyl N-methylcarbamate | w./v. | 20 |
| Perlankrol P.A. conc. | w./v. | 16.75 |
| Sulphated castor oil 70% | percent w./v. | 7.5 |
| Triethanolamine | percent w./v. | 7.5 |
| High boiling tar acids D.X.L. | percent w./v. | 40 |
| Spindle oil to 100% vol. (ca. 8% v./v.). | | |

Example 6

A mixture of 3,5-di-t-butylphenol (20.6 g.) methylcarbamoyl chloride (12.5 g.) and triethylamine (ca. 0.1 ml.) was heated on a steam-bath under reflux for 2 hours. The cooled mixture was stirred with water (400 ml.) and the sticky solid was collected, dried in vacuo, and crystallised from light petroleum (B.P. 62.8°). There was thus obtained 3,5-di-t-butylphenyl N-methylcarbamate identical to that described in Example 1.

Example 7

A solution of 3,5-di-t-butylphenol (12 g.) in methylene chloride (50 ml.) was treated with methyl isocyanate (3.4 g.) and triethylamine (ca. 0.1 ml.) and kept at room temperature for 5 days. The solution was washed with N-aqueous sodium hydroxide (to remove any unchanged phenol) and water, and dried over anhydrous sodium sulphate. Removal of the solvent and crystallisation of the residue from light petroleum gave 3,5-di-t-butylphenyl N-methylcarbamate.

We claim:
1. A method of protecting sheep from the larvae of sheep blowfly which comprises applying externally to the sheep an insecticidally effective amount of 3,5-di-t-butylphenyl N-methylcarbamate.

References Cited

UNITED STATES PATENTS

| 992,220 | 5/1911 | Little | 167—36 |
| 1,591,006 | 7/1926 | Alleman | 167—36 |
| 3,083,137 | 3/1963 | Weil | 167—30 |
| 3,179,557 | 4/1965 | Hausweiler et al. | 167—36 |

OTHER REFERENCES

Agricultural and Food Chemistry vol. 2, No. 17, August 18, 1954 pp. 864–870, Insecticidal Activity of Carbamate Cholinestrase Inhibitors—Kolbezen, et al.

ALBERT T. MEYERS, Primary Examiner
FREDERICK E. WADDELL, Assistant Examiner

U.S. Cl. X.R.
260—479